(12) United States Patent
Medana

(10) Patent No.: US 6,652,094 B1
(45) Date of Patent: Nov. 25, 2003

(54) SPECTACLES ASSEMBLY WITH A BOW-SHAPED FRAME AND SUPPORT CLIP FOR AN INTERCHANGEABLE FRONTAL LENS HOLDER

(75) Inventor: Guido Medana, Valdobbiadene (IT)

(73) Assignee: Foval Srl, Valdobbiadene (TV) (IT)

( * ) Notice: Subject to any disclaimer, the term of this patent is extended or adjusted under 35 U.S.C. 154(b) by 0 days.

(21) Appl. No.: 10/318,580

(22) Filed: Dec. 16, 2002

(51) Int. Cl.[7] .................................................. G02C 1/04
(52) U.S. Cl. ......................... 351/106; 351/86; 351/107; 351/133
(58) Field of Search ................................. 351/103–109, 351/83–86, 41, 47, 124, 133–135

(56) References Cited

U.S. PATENT DOCUMENTS 2,682,196 A * 6/1954 Baldanza et al. ............. 351/83
6,241,353 B1 * 6/2001 Anger .......................... 351/83
6,334,679 B2 * 1/2002 Masunaga et al. .......... 351/110
6,561,647 B1 * 5/2003 Chen ........................... 351/103

* cited by examiner

Primary Examiner—Huy Mai
(74) Attorney, Agent, or Firm—Harrison & Egbert

(57) ABSTRACT

Spectacles assembly with a bow-shaped frame and support clip for an interchangeable frontal lens holder. The assembly includes: a bow with arms, for the support of the frontal lens holder; a frontal lens holder made out of profiled material, where the said material goes around at least a part of the outer edge of the lens; and a device with a flexible movement, used to join the frontal lens holder to the bow. The flexible device is formed in correspondence with the connection bridge between the two arch-shaped sections which make up the bow. The frontal closed-ring lens holder has a connection bridge between the peripheral support of the lenses, with the bridge being hooked by a clip which is formed monolithically by the bow.

7 Claims, 2 Drawing Sheets

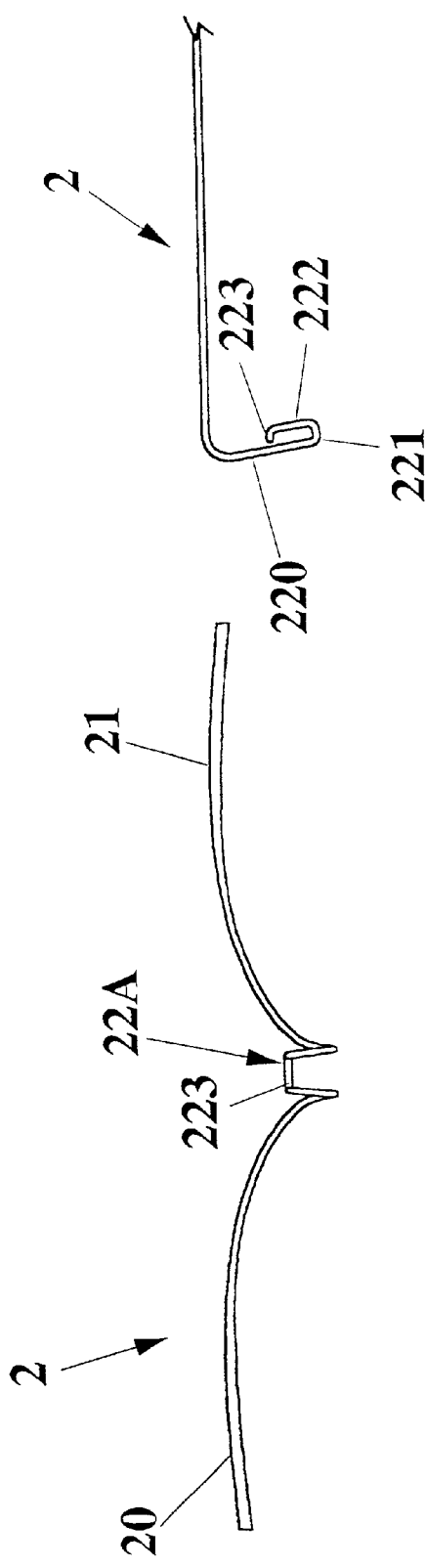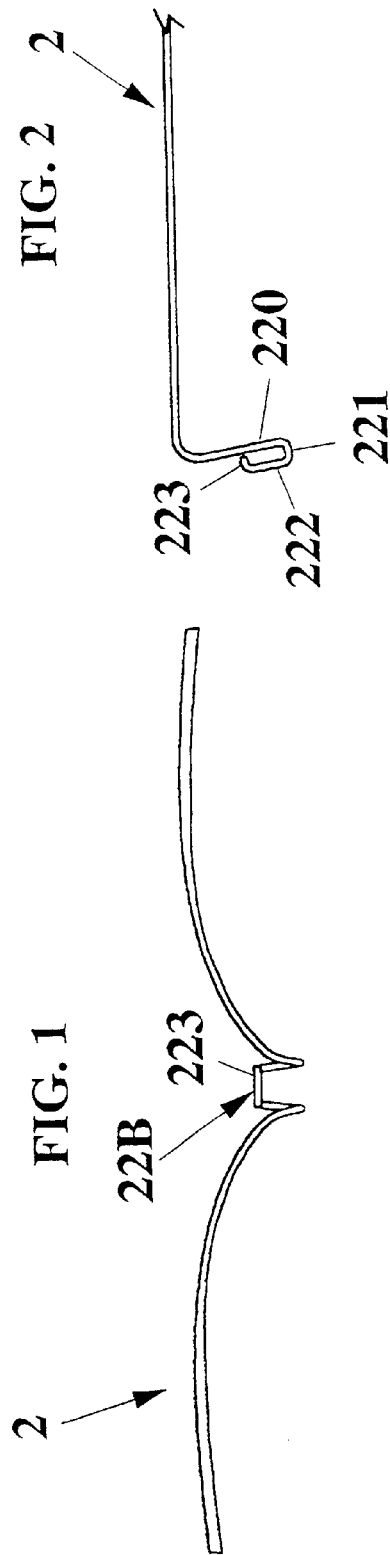

SPECTACLES ASSEMBLY WITH A BOW-SHAPED FRAME AND SUPPORT CLIP FOR AN INTERCHANGEABLE FRONTAL LENS HOLDER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The object of this invention is a spectacles assembly with a bow-shaped frame and support clip for an interchangeable frontal lens holder.

BACKGROUND OF THE INVENTION

The proposal may be used especially, but not exclusively, in the sector involved in the production and commerce of lightweight, multipurpose spectacles.

Frames for spectacles are well known, and they are mainly made from a frame which is used to hold the lenses, that is, the front part, formed by the two rings of the spectacles, which are joined together by an intermediate bridge, nose-pads, which are sometimes formed monolithically together with the two rings, and by two support arms.

There are various solutions available on the market. Amongst the most significant solutions, for example, there is EP546589 (Lindberg), the object of which is the support means for the lenses in the spectacles, especially of the type with a wire frame. Variations of the main solution are also described, especially regarding the support structure for the lenses, in this case where the wire is made in such a way that it runs along only the lower part of each lens in one of the variations, and along the upper part of the lens in another of the variations. As a result, by bending and twisting the wire, a single structure is created in the form of a bow, which acts as a joint at the sides of the spectacles for hinging the arms, as a joint for the two lenses by means of a bridge in the center, and also as a fixing point for the respective nose-pads.

There are also other types of spectacles formed by a bow-shaped frame, which uses only the upper arch to hold the lenses.

A conventional type, for example, foresees a lightweight bow-shaped frame made from either plastic or metallic material which, due to its shape, runs from one side to the other along only the upper part. In this way, the lenses are fixed against the bow of the spectacles. Going further into detail, there are a number of holes along the upper edge of the lenses, through which fixing points, formed perpendicularly with respect to the frame, are inserted. The said fixing points are small studs with a threaded end onto which, once they are fitted through the corresponding holes in the lens, a small star-nut or other kind of nut is tightened. A development of the above-mentioned proposal is described in WO 02/10840 (Tabacchi), and is made up of a support bow for the interchangeable frontal lens holder which, in order to fasten the lenses or visor to the frontal bow, does not require screws or nuts to fasten it to the mounting.

A second conventional proposal also foresees a bow which, to the side, forms two counter-shaped portions, each one of which is shaped like an arch to fit the curved profile of the relative lens which is to be mounted. The bridge, which is also curved, and which joins the two portions which hold the lenses, is formed monolithically together with the portions, by shaping that particular part of joining wire. The outside ends of each of the two arched sections, that is the ends of the bow, are bent at approximately 90° towards the rear part of the spectacles, and have the joint for the corresponding hinge for the hinging movement of the arm soldered onto it. Each section also has hooks or clips which are soldered on and stick out with respect to the upper portion of metallic wire, and are used to hold the lens against the bow.

It is also well known that, in some cases, people who wear prescription glasses need to protect their eyes from the sunlight, but without spoiling their appearance. The choice in theses cases is somewhat limited, and it is conditioned by certain factors such as the strength of the lenses, or by the environment in which the spectacles are mainly used. Amongst the solutions which are currently available to the consumer, one of them consists in a kind of visor-type mounting which is placed over the existing lenses of the spectacles, and which is hooked on to the main front part with clips, usually along the upper arch of the spectacles and the bridge.

The first proposals of the clip-type similar to the one described above, and which allow a pair of spectacles to hold a second lens holder with protective lenses, are mentioned, for example, in WO 93/24856 (Salk) or in U.S. Pat. No. 6,257,718 (Spencer).

State of the Art Most Similar to the Invention

In U.S. Pat. No. 6,382,787 (Xie), there is the description of a pair of spectacles which has a clip, and which in this case is positioned to correspond with the bridge of a mounting and is turned towards the rear part of the spectacles. The said clip, which joins the mounting to the corresponding frame, overlaps and hooks the corresponding bridge of the support frame to which the relative arms are joined. Finally, a number of magnets, which are attached to the mounting in correspondence with the nose-rests, stabilize the whole assembly.

U.S. Pat. No. 6,283,591 (Chen) also describes a mounting, but in this case it may be joined and fastened to the front part of a pair of spectacles, of the type which includes a conventional frame formed by two rings which are joined along the upper part by a bridge. Going further into detail, the mounting is also made up of two rings connected together by a bridge, and has a tightening mechanism on one side which basically includes a clip or grip with a flexible catch, which hinges in correspondence with one of the ends. In detail, the said clip, in joining the mounting to the front of the spectacles, straddles the bridge and flexes slightly so that the bridge in the front of the spectacles enters inside the seat along the inner part of the catch, and is kept pushed against a stop point which works together with the said catch.

Finally, a system to interchange the lenses applied to a frame for spectacles is also described in U.S. Pat. No. 6,325,506 (Cooper). In this case, there is a bow which supports both the mounting and the spectacles. In particular, the said bow, in correspondence with the bridge, also has a lever-type flexible grip which works against the action of a spring. On one side of the said bow, a mounting is attached so that it goes against corresponding male-female fastenings along the outer side of the bow. Also, the said grip is positioned so that it straddles the bridge in correspondence with the intermediate dip between the two protection surfaces, and with the ends of which is able to grip and hold the lenses of the front of the spectacles.

In view of the above, it can be summarized that the following are part of a well known technique:

- a bow and arms for the support of a frontal lens holder;
- a frontal lens holder made out of wire, where the wire goes around at least a part of the outer edge of the lens;
- a device with a flexible movement, which does not require the use of screws, used to join the frontal lens holder to the bow; and
- the positioning of the flexible device located on the bridge which connects the two arch-shaped sections which make up the said bow.

Drawbacks

There are various drawbacks which may often be encountered with the solutions mentioned above.

In the solutions made up by joining the frame or main mounting to the visor, it is difficult to keep the lenses well clamped. In fact, even though they are subject to the action of the clips which overlap along the outer part or even by magnets, there is quite a lot of play with respect to the frame. Under these circumstances, if the spectacles are slightly twisted along the front axis, for example, the lenses may fall out.

This leads to the lenses failing out and being ruined, for example, if they fall against an abrasive surface, or they may even be lost.

As far as similar solutions are concerned, they are applications which require quite complex work processes and which sometimes need either holes, welding or adhesives. In spite of this, even in this case, the frames are delicate and must be used with extreme care.

In comparing all of these solutions, it is clear that they are basically complex mountings which use a lot of parts and small components which, apart from making the structure heavy, do not allow the assembly steps to be rationalized, leading to considerable production costs. To sum up, they make the assembly and control of a large number of coded items in the stores a complicated issue.

The aim of this invention is, therefore, to identify an optimum solution for the frames of spectacles.

BRIEF SUMMARY OF THE INVENTION

These and other aims are achieved with this invention according to the characteristics described in the attached claims, by solving the problems mentioned above by means of a spectacles assembly with a bow-shaped frame and support clip for an interchangeable frontal lens holder, which includes:

- a bow with arms for the support of the frontal lens holder;
- a frontal lens holder made out of profiled material, where the said material goes around at least a part of the outer edge of the lens; and
- a device with a flexible movement, used to join the frontal lens holder to the bow; the said flexible device formed in correspondence with the connection bridge between the two arch-shaped sections which make up the said bow; in which, the frontal closed-ring lens holder has a connection bridge between the peripheral support of the lenses, with the said bridge being hooked by a clip which is formed monolithically by the bow.

Advantages

In this way, by means of the significant creative content, which leads to an immediate technical progress, various objectives are reached.

One of the aims is to propose improvements to the bow structure, by optimizing the clamping system of the lenses. Going further into detail, they are rigidly joined to the bow. This effect means that they can not accidentally drop out even if the frame is used incorrectly or twisted.

The second aim leads to the structure of the spectacles being more solid, especially when subject to deformations which usually occur due to even partial wear in correspondence with the clamping devices for the lenses.

The third aim is to create a structure which does not have screws or nuts for joining the bar to the lens holder.

The fourth aim is to create a lens holder which is attached centrally, to guarantee a good optical stability of the lenses.

The fifth aim is the creation of the bar and lens holder, made out of different materials to form new chromatic and/or industrial matches.

The sixth aim is to reduce the weight and create a lightweight structure.

The seventh aim is to guarantee efficient, economic repairs to the damaged parts and reuse of the good parts.

The final aim is the possibility of creating an item which does not require particular or complex work phases for the mounting of the lenses, and furthermore, which has a high technological level and acceptable production costs.

These and other advantages will be demonstrated in the following detailed description and attached schematic drawings of at least one preferential application of the solution, the details of which are intended to be an example and not a limitation.

BRIEF DESCRIPTION OF THE SEVERAL VIEWS OF THE DRAWINGS

FIG. 1 is a front plan view of the bow-shaped frame.

FIG. 2 is a side view of the bow-shaped frame as illustrated in FIG. 1.

FIG. 3 is a front plan view of a variation of the bow-shaped frame as illustrated in FIG. 1.

FIG. 4 is a side view of the bow-shaped frame as illustrated in FIG. 3.

DETAILED DESCRIPTION OF THE INVENTION

Figure 5:
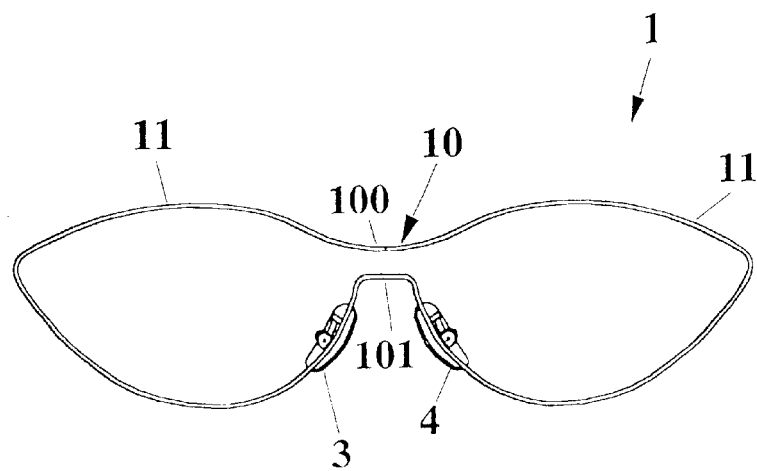
FIG. 5 is a front plan view of only the frontal lens holder.
Figure 7:
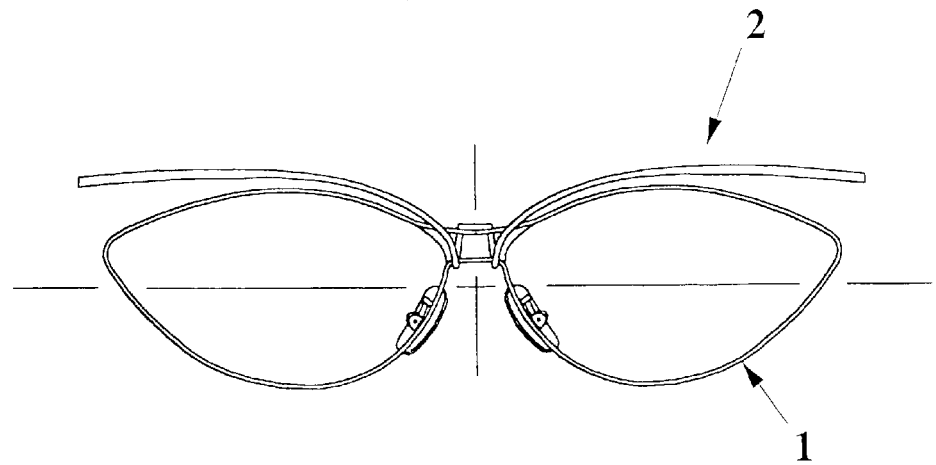
FIG. 7 is another plan view of the frontal lens holder joined to the respective bow.
Figure 6:
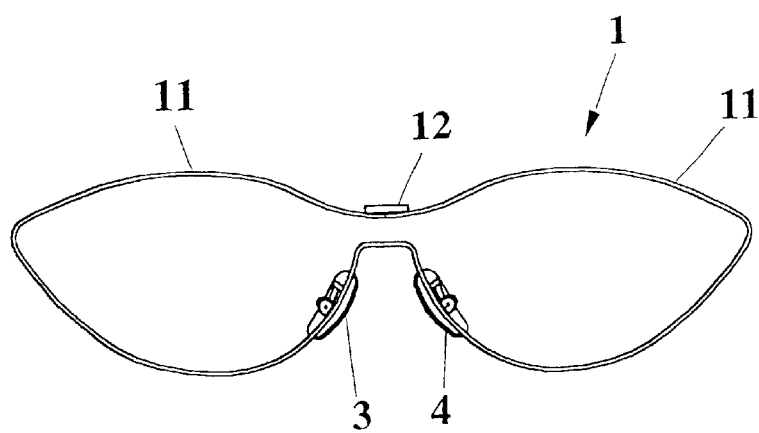
FIG. 6 is a front plan view of a variation of the frontal lens holder as illustrated in FIG. 5.

In one of the preferred applications, and with reference to the attached drawings, there is a lightweight spectacles structure, given by the frontal lens holder 1 which is joined to a bow 2 and which hangs centrally.

In a first example, the frontal lens holder 1 is made up of a shaped, continuous, flexible, metallic profile which is in the form of closed rings, and which adapts to peripherally fasten around almost all of the perimeter of each of the lenses in the spectacles. The shape which is given to the lens holder 1 is such that it forms two rings 11, right and left respectively, joined by an intermediate portion 10 which forms the connection bridge between them. As a result, in this case, each of the two lenses, right and left, is held by the same lens holder 1. Furthermore, in the intermediate part 10 of the lens holder 1, in correspondence with the connection bridge between the two rings of the said frontal lens holder, the profile comes closer together to form the correct distance between the lenses which are thus held, and there is a more or less parallel part of the profile formed by 100 and 101. As a result, the tension which is applied in correspondence with the bridge 10, and which acts to bring the two portions of the profile 100 and 101 even closer together, is calibrated in order to firmly grip both lenses around their perimeter, and if the tension is reduced, the lenses may thus be replaced.

It is in correspondence with the bridge 10 of the lens holder 1 that the corresponding bow-shaped frame 2 may be attached. In particular, the bow-shaped frame 2 is formed by a single bar, in this case metallic, shaped in such a way that it forms two mirror-image sections shaped like an arch, right 20 and left 21, respectively, each of which corresponds to an underlying, independent lens held by the lens holder 1. The two sections 20 and 21 are joined by a connection piece 22A and 22B which is also formed monolithically by localized bending and re-bending of the part of the wire as required, in order to form a saddle-clip. The saddle-clip 22A and 22B shaped in this way by following the development in correspondence with the end of one of the two mirror-image arch sections 20 and 21, is formed by bending the center of the bow-shaped frame 2, with the first part 220 which goes downwards, followed by a second part 221 which goes towards the inside of the spectacles more or less perpendicularly with respect to the first bend, a third bend 222 which is more or less in the opposite direction and displaced with respect to the first portion, and finally by a fourth bend 223 perpendicular to the third bend 222 in order to close the saddle-clip.

In a first example of a saddle-clip 22A, the hooking portion formed by parts 221, 222 and 223 faces the inside of the structure of the spectacles, as shown in FIGS. 1 and 2. In a second example of a saddle clip 22B, on the other hand, it faces the outside, as shown in FIGS. 3 and 4.

In both cases, in attaching the frontal 1 to the bow-shaped frame 2, it is important to ensure that the saddle-clip 22A and 22B fits in correspondence with the connection bridge 10 in the lens holder 1, by initially opening the flexible portions 222 and 223 in order to insert both of the parallel portions of the profile 100 and 101 into the saddle, followed by putting them back in position to pull the lens holder and bring the parallel parts of the profile 100 and 101 together.

In a preferred application, the joining of the bow-shaped frame 2 and the lens holder 1 is further improved, by using a tooth 12 in correspondence with only the upper part 100 of the bridge 10. In this case, there is a short portion of the upper profile which is welded on top of the main part of the upper profile 100. In this example, regarding the hooking of the lens holder 1 to the bow-shaped frame 2, it is the portion 223, therefore, which is pressed up against the tooth 12.

In yet another preferred application, the clip 220, 221, 222 and 223, formed by the shaped bar 2, may be formed with an inverted shape which hooks under and over the continuous profile of the frontal lens holder 1, again in correspondence with the intermediate connection portion between the two support rings for the lenses.

In the example mentioned above, the material used to make both the bow 2 and the frontal lens-holder 1 may be of different kinds, such as metal or plastic, and formed by either shearing, milling, laser-cutting or other kinds of process.

Finally, as far as the nose-pads 3 and 4 are concerned, they may be applied, by welding for example, next to the saddle-clip 22A and 22B or, as an alternative, they may be joined to the lens holder 1 in a conventional position.

I claim:

1. Spectacles assembly with a bow-shaped frame and support clip for an interchangeable frontal lens holder, said assembly comprising:

a bow and arms for support of a frontal lens holder;

a frontal lens holder which goes around at least a part of an outer edge of the lens; and a device with a flexible movement, used to join the frontal lens holder to the bow;

wherein said flexible device is formed in correspondence with a bridge which connects two arch-shaped sections which comprise said bow; and wherein said frontal lens holder comprises a connection bridge for peripheral support of the lenses, with said bridge being hooked and suspended by a clip which is comprised monolithically by the bow.

2. Spectacles assembly with a bow-shaped frame and support clip for a frontal lens holder according to claim 1, wherein said frontal lens holder is comprised of a shaped, continuous, flexible, metallic profile which is comprised of closed rings, and which adapts, at two opposite ends, to peripherally fasten around almost all of a perimeter of each lens in the spectacles, and wherein a shape comprises two rings, right and left respectively, joined by an intermediate portion which forms a connection bridge between two circular portions.

3. Spectacles assembly with a bow-shaped frame and support clip for a frontal lens holder according to claim 1, wherein, in the lens holder comprised of a closed-ring profile, and open at a center, said connection bridge between the two circular portions is such that the profile comes closer together to form a portion which is more or less parallel.

4. Spectacles assembly with a bow-shaped frame and support clip for a frontal lens holder according to claim 1, wherein, in the lens holder, said connection bridge hooks to a bow-shaped frame comprised of a single length of bar, shaped in such a way to form two mirror-image bow-shaped sections, right and left respectively, joined by portion which forms the clip, also formed monolithically to locally create a saddle shape.

5. Spectacles assembly with a bow-shaped frame and support clip for a frontal lens holder according to claim 1, further comprising a saddle-clip, following development in correspondence with an end of one of the two mirror-image bow-shaped sections, and being comprised of a first part which curves downwards, a second part which goes towards an inside of the spectacles more or less perpendicularly with respect to a first bend, a third part which is more or less in the opposite direction and displaced with respect to the first portion, and a fourth part which is perpendicular to the third part in order to close the saddle-clip, and goes in a longitudinal direction with respect to the bow-shaped frame.

6. Spectacles assembly with a bow-shaped frame and support clip for a frontal lens holder according to claim 5, wherein, in the saddle-clip, a hooking portion points towards either an inside or an outside, or may be formed upwards and downwards or downwards and upwards with respect to the structure of the spectacles.

7. Spectacles assembly with a bow-shaped frame and support clip for a frontal lens holder according to claim 1, further comprising, only in correspondence with a portion of an upper profile of the bridge of the lens holder, a tooth.

\* \* \* \* \*